(12) United States Patent
Dong et al.

(10) Patent No.: US 12,093,814 B2
(45) Date of Patent: Sep. 17, 2024

(54) HYPER-PARAMETER MANAGEMENT

(71) Applicant: INTERNATIONAL BUSINESS MACHINES CORPORATION, Armonk, NY (US)

(72) Inventors: Lin Dong, Beijing (CN); Chao Xue, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 770 days.

(21) Appl. No.: 16/544,969

(22) Filed: Aug. 20, 2019

(65) Prior Publication Data
US 2021/0056457 A1 Feb. 25, 2021

(51) Int. Cl.
*G06N 3/08* (2023.01)
*G06F 18/214* (2023.01)
*G06N 20/00* (2019.01)
*G06V 10/764* (2022.01)
*G06V 10/776* (2022.01)
*G06V 10/82* (2022.01)

(52) U.S. Cl.
CPC ............ *G06N 3/08* (2013.01); *G06F 18/214* (2023.01); *G06N 20/00* (2019.01); *G06V 10/764* (2022.01); *G06V 10/776* (2022.01); *G06V 10/82* (2022.01)

(58) Field of Classification Search
None
See application file for complete search history.

(56) References Cited

U.S. PATENT DOCUMENTS

| 2014/0344193 A1 | 11/2014 | Bilenko |
| 2019/0042887 A1 | 2/2019 | Nguyen |
| 2021/0398013 A1* | 12/2021 | Liu ........................... G06F 9/50 |

OTHER PUBLICATIONS

Yao Q, Wang M, Chen Y, Dai W, Li YF, Tu WW, Yang Q, Yu Y. Taking human out of learning applications: A survey on automated machine learning. arXiv preprint arXiv:1810.13306. Jan. 17, 2019. 26 pages. (Year: 2019).*

(Continued)

*Primary Examiner* — Vincent Gonzales
(74) *Attorney, Agent, or Firm* — CANTOR COLBURN LLP; Teddi Maranzano

(57) ABSTRACT

A method, system, and computer program product for hyper-parameter determination. In a method, a network architecture of a learning model may be determined, and the learning model may be configured for performing a computing task based on machine learning. A metric value record associated with a group of hyper-parameters may be obtained during hyper-parameter determination for the learning model. An estimation of a metric value may be obtained based on the network architecture, and the metric value record and an association relationship representing an association between network architectures and metric values for the network architectures. The group of hyper-parameters may be selected in response to the estimation of the metric value meeting a predefined criterion. With these embodiments, a group of hyper-parameters may be selected, and further the learning model may be trained based on the selected group of hyper-parameters.

18 Claims, 12 Drawing Sheets

(56) References Cited

OTHER PUBLICATIONS

Domhan T, Springenberg JT, Hutter F. Speeding up automatic hyperparameter optimization of deep neural networks by extrapolation of learning curves. In Twenty-fourth international joint conference on artificial intelligence Jun. 27, 2015. (Year: 2015).*

Abraham A, Nath B. Hybrid heuristics for optimal design of artificial neural networks. In Developments in Soft Computing 2001 (pp. 15-22). Physica, Heidelberg. (Year: 2001).*

Abadi M, Barham P, Chen J, Chen Z, Davis A, Dean J, Devin M, Ghemawat S, Irving G, Isard M, Kudlur M. {TensorFlow}: a system for {Large-Scale} machine learning. In 12th USENIX symposium on operating systems design and implementation (OSDI 16) 2016 (pp. 265-283). (Year: 2016).*

Prechelt, Lutz. "Early stopping-but when?. " In Neural Networks: Tricks of the trade, pp. 55-69. Berlin, Heidelberg: Springer Berlin Heidelberg, 2002. (Year: 2002).*

Klein et al. "Fast Bayesian Optimization of Machine Learning Hyperparameters on Large Datasets", Proceedings of the 20th International Conference on Artificial Intelligence and Statistics (AISTATS) 2017, Fort Lauderdale, Florida, USA, JMLR: W&CP vol. 54. Copyright 2017, 9 pages.

Li et al, "Hyperband: A Novel Bandit-Based Approach to Hyperparameter Optimization", arXiv:1603.06560v4 [cs.LG] Jun. 18, 2018, Journal of Machine Learning Research 18 (2018) , pp. 1-52, Submitted Nov. 2016; Revised Dec. 2017; Published Apr. 2018.

Liu et al., "Progressive Neural Architecture Search", arXiv:1712.00559v3 [cs.CV] Jul. 26, 2018, 20 pages.

Mell et al., "The NIST Definition of Cloud Computing", Recommendations of the National Institute of Standards and Technology, Special Publication 800-145, Sep. 2011, 7 pages.

https://cloud.google.com/ml-engine/docs/tensorflow/hyperparameter-tuning-overview, Overview of Hyperparameter Tuning, Mar. 7, 2019, Overview of Hyperparameter Tuning | Cloud ML Engine for TensorFlow | Google Cloud, pp. 1-6.

* cited by examiner

HYPER-PARAMETER MANAGEMENT

BACKGROUND

The present invention generally relates to machine learning. Specifically, the present invention relates to computer-implemented methods, computer-implemented systems and computer program products for hyper-parameters determination for a machine learning model.

With developments of machine learning technology, various types of computing tasks may be facilitated by machine learning models. For example, in a field of image classification, face recognition and the like, machine learning models may be built for desired purposes. Hyper-parameters play important roles in building the learning models and the accuracy of learning models may be greatly increased if appropriate hyper-parameters are selected. Therefore, how to manage hyper-parameter(s) for a learning model becomes a hot focus.

BRIEF SUMMARY

According to an embodiment of the present invention, there is provided a method. In the method, a network architecture of a learning model may be determined, and the learning model here may be configured for performing a computing task based on machine learning. A metric value record associated with a group of hyper-parameters may be obtained during hyper-parameter determination for the learning model. An estimation of a metric value may be obtained based on the network architecture, and the metric value record and an association relationship may represent an association between network architectures and metric values for the network architectures. The group of hyper-parameters may be selected in response to the estimation of the metric value meeting a predefined criterion.

According to another embodiment of the present invention, there is provided a computer-implemented system. The computer-implemented system comprises a computer processor coupled to a computer-readable memory unit, where the memory unit comprises instructions that when executed by the computer processor implements the above method.

According to another embodiment of the present invention, there is provided a computer program product. The computer program product comprises a computer readable storage medium having program instructions embodied therewith. The program instructions are executable by an electronic device to cause the electronic device to perform actions of the above method.

It is to be understood that the summary is not intended to identify key or essential features of embodiments of the present invention, nor is it intended to be used to limit the scope of the present embodiment. Other features of the present embodiment will become easily comprehensible through the description below.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

Throughout the drawings, same or similar reference numerals represent the same or similar elements.

DETAILED DESCRIPTION

Figure 1:
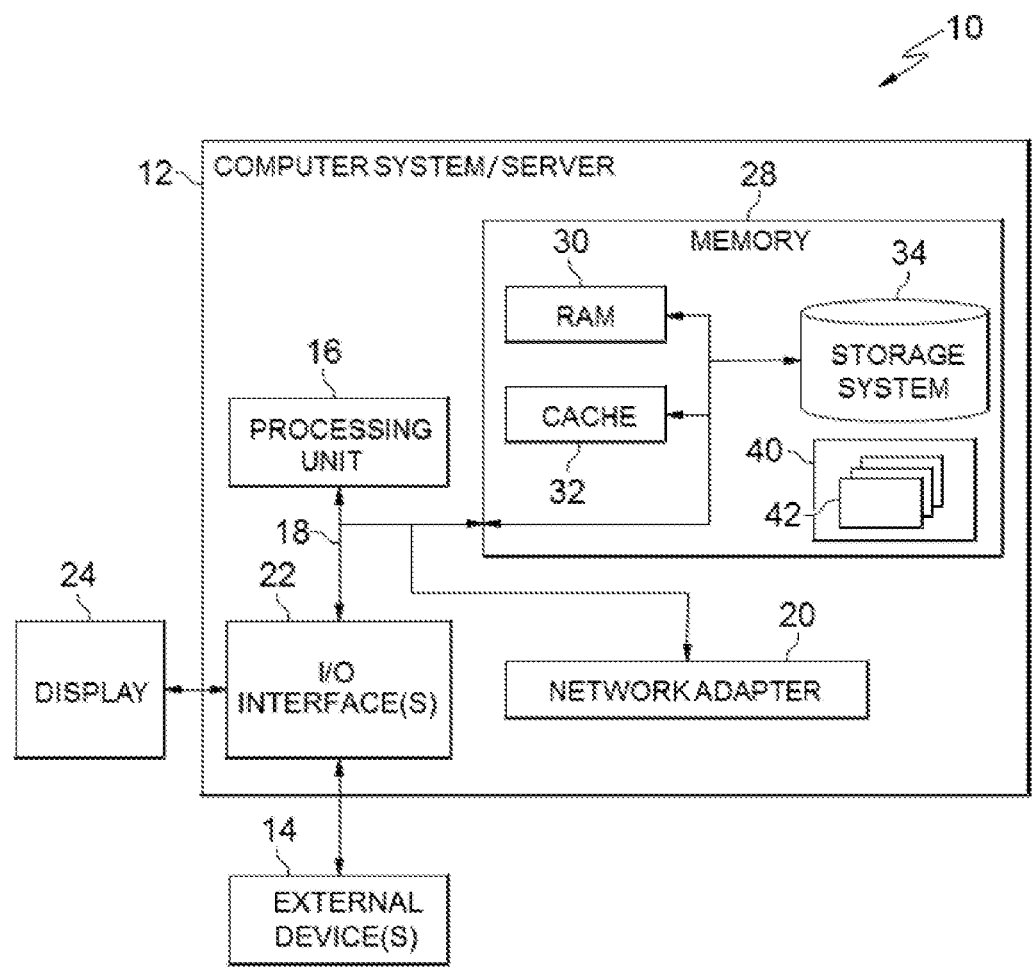
FIG. 1 depicts a cloud computing node according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be appropriate for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced. ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
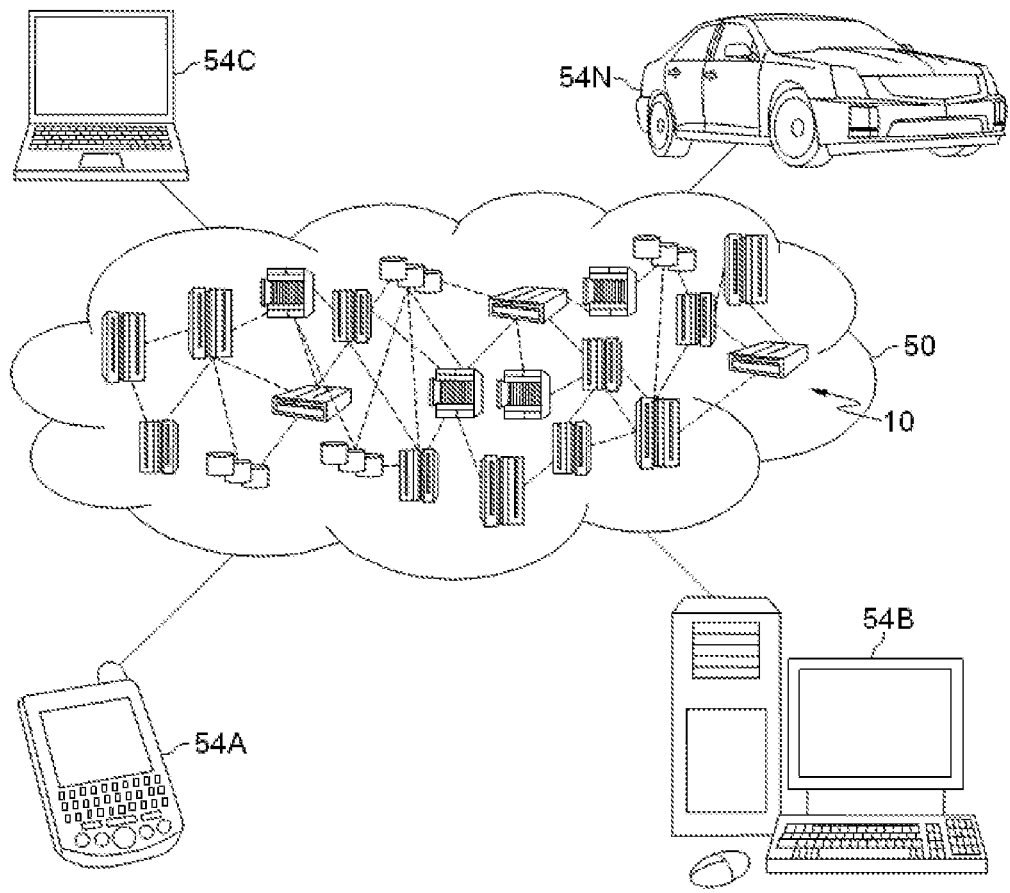
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
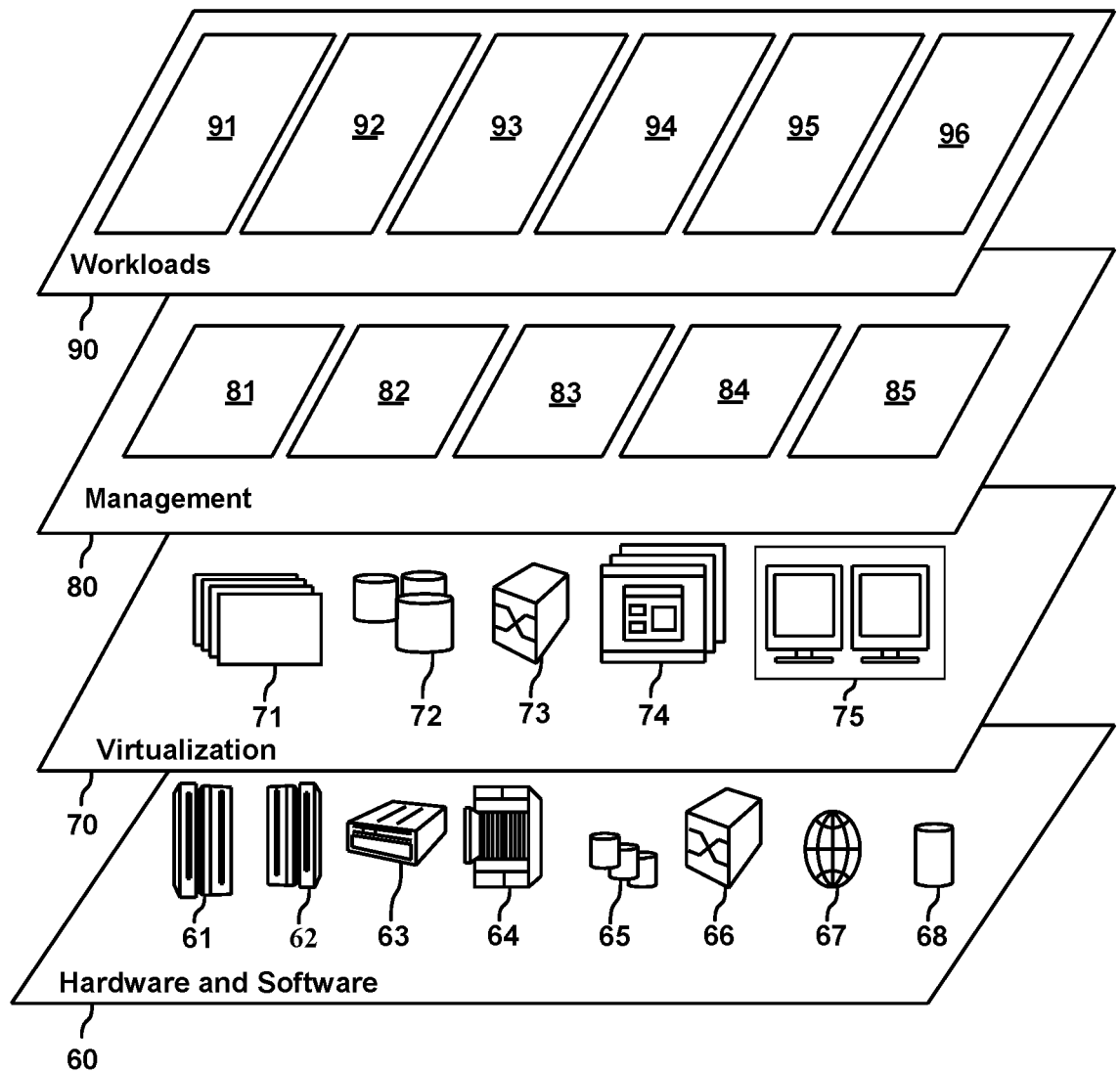
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and hyper-parameter management 96.

It should be noted that the processing of hyper-parameter management 96 according to embodiments of this invention could be implemented by computer system/server 12 of FIG. 1. Hereinafter, reference will be made to FIG. 4 to FIG. 11 to describe details of the hyper-parameter management 96.

Nowadays, various types of learning models may be designed for performing computing tasks. For example, images may be processed by a learning model to classify the images into various types based on the content of the image, and face recognition may be performed by a learning model to find a target person. Before a teaming model is really trained, a group of hyper-parameters should be determined for training the learning model. A hyper-parameter is a configuration that is external to the learning model and whose value cannot be estimated from sample data. Some examples of hyper-parameters may include: the learning rate for training a neural network, the C and sigma hyper-parameters for supporting vector machines, and the k in k-nearest neighbors, and the like.

In machine learning, hyper-parameter determination/optimization relates to choosing a group of optimal hyper-parameters for the learning model. A hyper-parameter is a parameter whose value is used to control the learning process. By contrast, the values of other parameters (typically node weights) may be learned from sample data. By now, there have been proposed various procedures for hyper-parameter determination, which may find a group of hyper-parameters that yields an optimal learning model and minimizes a predefined loss function for the learning model. However, procedures for determining the optimal hyper-parameter(s) may involve hundreds of or even more iterations of experiments.

Figure 4A:
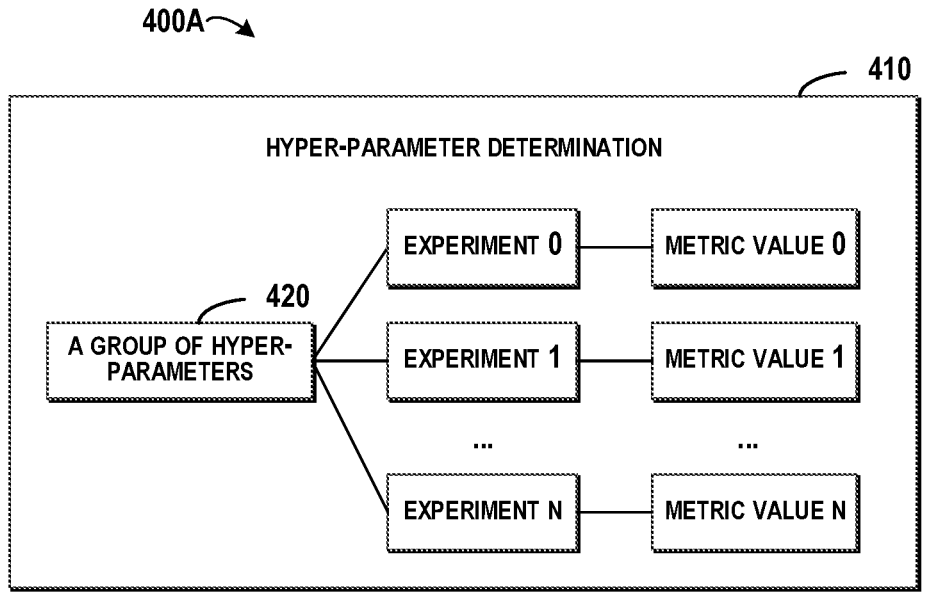
FIG. 4A depicts an example diagram of hyper-parameter determination in which an embodiment of the present invention may be implemented.

Reference will be made to FIG. 4A to provide a general description of a working environment of embodiments of the present invention. For a purpose of description, embodiments of the present invention will be described by taking image classification as an example of computing task. It is to be understood that the embodiments may be implemented for other types of computing tasks such as face recognition, text processing and the like. FIG. 4A depicts an example diagram 400A of hyper-parameter determination 410 in which an embodiment of the present invention may be implemented. In order to build a learning model, a group of hyper-parameters 420 may be determined first in the hyper-parameter determination 410. During hyper-parameter determination 410, a plurality of experiments may be iterated for selecting hyper-parameter(s) that are appropriate for the learning model.

As depicted in FIG. 4A, the group of hyper-parameters 420 may be prepared in a preprocessing phase, and various solutions that have been developed and/or to be developed in future may be applied in the preprocessing phase. Further, a plurality of experiments (such as Experiment 0, Experiment 1, . . . , and Experiment N) may be iterated to obtain a plurality of metric values (such as Metric Value 0, Metric Value 1, . . . and Metric Value N), respectively. Here, the metric values may represent whether the group of hyper-parameters 420 is appropriate for the learning model. Usually, the experiments may be iterated for a plurality of times and the metric values may show a convergence during the iterations. A metric value occurred at the convergence may represent an extreme value for the metric values. Usually, the lower the extreme value is, the more appropriate the group of hyper-parameters is.

Figure 4B:
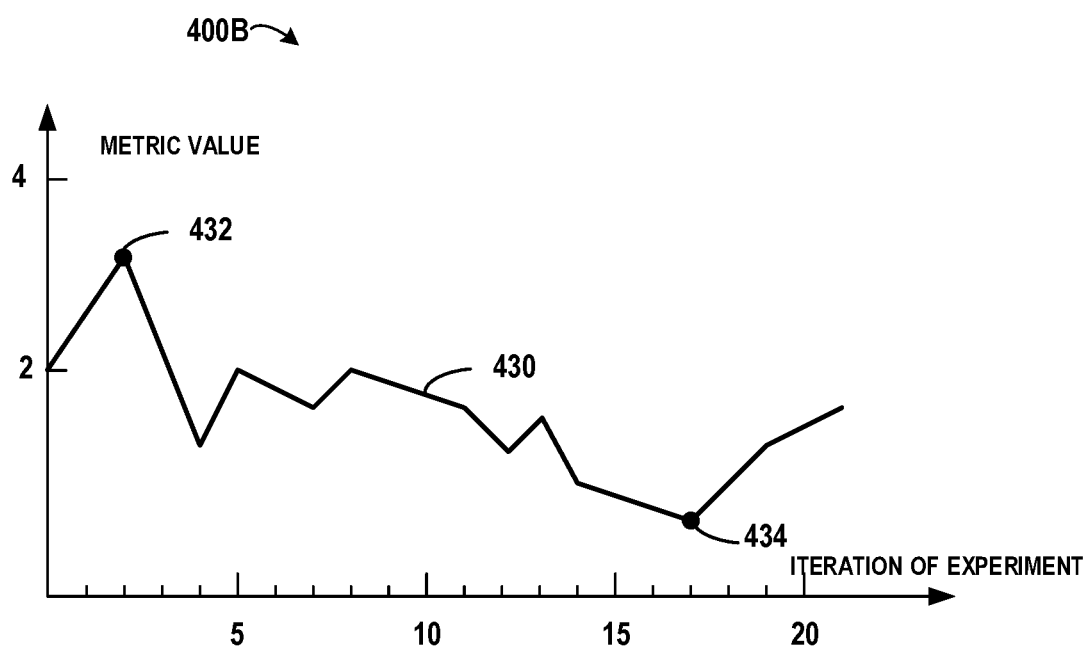
FIG. 4B depicts an example diagram of a curve of the metric value obtained during the hyper-parameter determination as depicted in FIG. 4A.

It is to be understood that the convergence may occur in any of the experiments, and sometimes the experiments should be iterated several hundreds of times or even more to reach the convergence. FIG. 4B depicts an example diagram 400B of a curve 430 of the metric value obtained during the hyper-parameter determination 410 as depicted in FIG. 4A. In FIG. 4B, the abscissa axis represents the iteration of experiment, and the vertical axis represents the metric value. The curve 430 show the metric values for each iteration of experiment, where a value 432 in the curve 430 in FIG. 4B indicates a metric value that is obtained in Experiment 2 of FIG. 4A, and a value 434 shows the extreme value corresponding to a convergence which is obtained in the $17^{th}$ iteration of the experiment. However, if the iterations end before the $17^{th}$ iteration, then the extreme value will not occur, and an appropriate level for the group of hyper-parameters 420 cannot be determined accurately.

It is to be understood that great time and computing costs may be involved in each iteration, and thus most of the hyper-parameter determinations 410 only implement tens of iterations and usually cannot reach the convergence. Accordingly, the hyper-parameter determination 410 is based on the partially implemented iterations and cannot reach a desired accuracy.

In view of the above, embodiments of the present invention provides an effective solution for determining a group of hyper-parameters for a learning model. In embodiments of the present invention, with respect to a group of hyper-parameters, a network architecture of the learning model and a metric value record may be used for evaluating whether the group of hyper-parameters are appropriate for the learning model. Specifically, the metric value record may be associated with only several iterations of experiments, and based on the metric value record, the network architecture, and an association relationship, an estimation of the metric value which is closer to the convergence may be obtained. With the above solution, the appropriate level of the group of hyper-parameters 420 may be determined in a more efficient and accurate manner, so as to increase the performance of the hyper-parameter determination 410.

Figure 5:
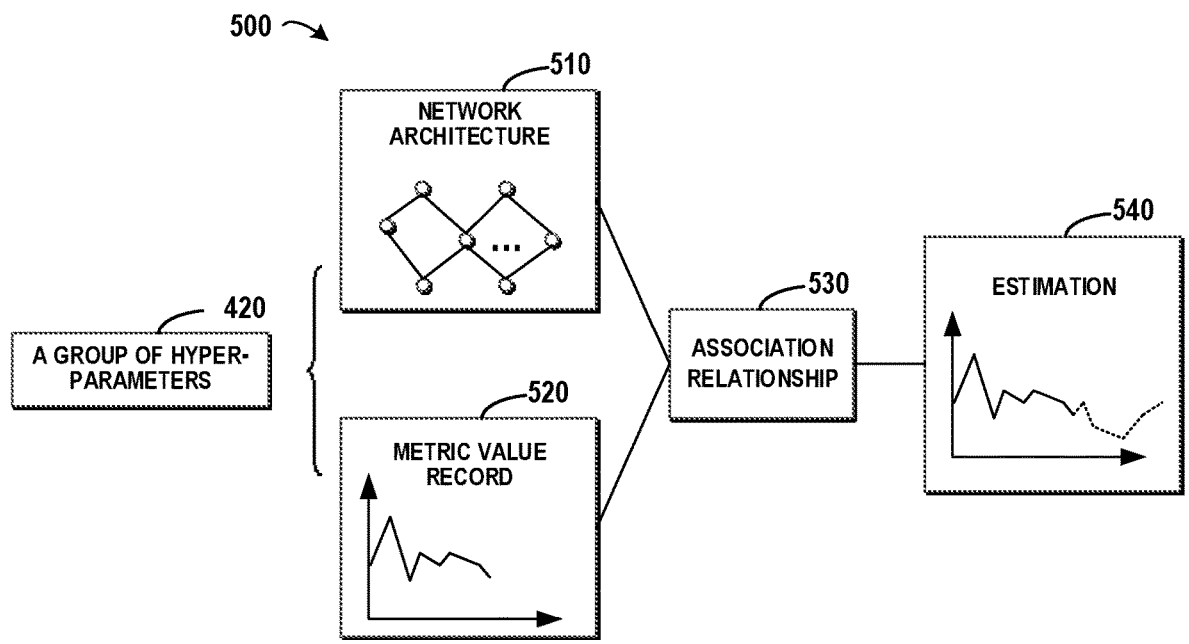
FIG. 5 depicts an example diagram for determining a hyper-parameter according to an embodiment of the present invention.

Hereinafter, reference will be made to FIG. 5 for a general description of embodiments of the present invention. FIG. 5 depicts an example diagram 500 for determining a hyper-parameter according to an embodiment of the present invention. Although FIG. 5 shows implementations related to the group of hyper-parameters 420, embodiments of the present invention may be implemented for each of multiple groups of hyper-parameters so as to select a better group of hyper-parameters.

In FIG. 5, with respect to the group of hyper-parameters 420, a network architecture 510 may be determined for the learning model, and a metric value record 520 may be obtained. Here, the metric value record 520 may comprise metric values obtained in a small number of iterations. The network architecture 510 and the metric value record 520 may be inputted into an association relationship 530, so as to obtain an estimation 540 that may show a tendency for the iterations. As the association relationship 530 is trained based on history data, more reliable grounds may be provided for the hyper-parameters determination 410.

Figure 6:
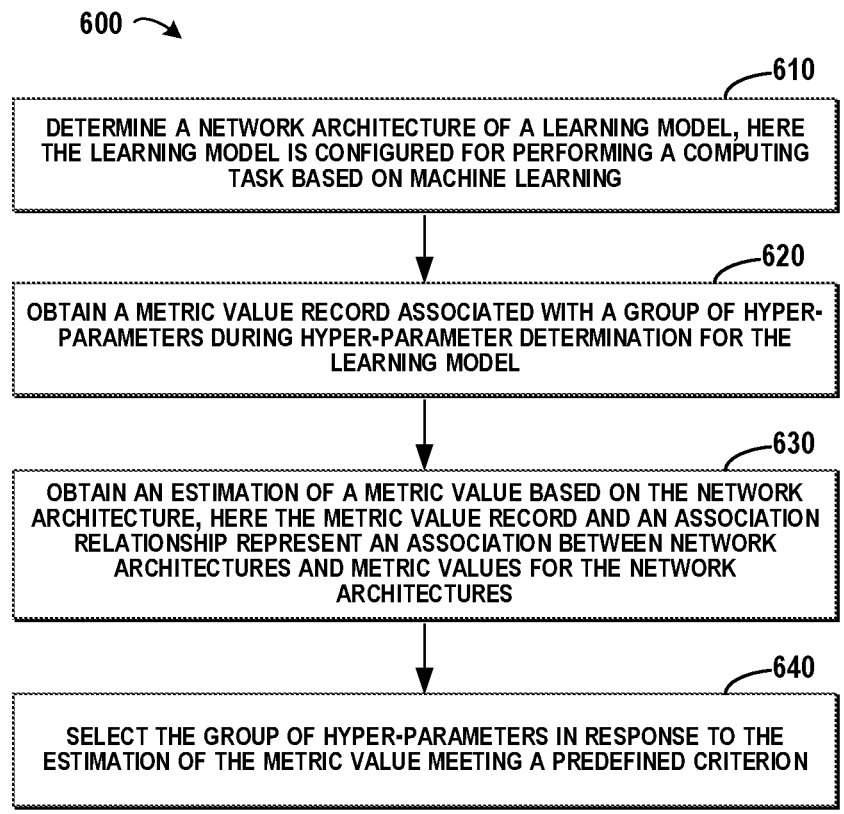
FIG. 6 depicts an example flowchart of a method determining a hyper-parameter according to an embodiment of the present invention.

Hereinafter, reference will be made to FIG. 6 for more details about embodiments of the present invention. FIG. 6 depicts an example flowchart of a method 600 for determining a hyper-parameter according to an embodiment of the present invention. At block 610, the network architecture 510 may be determined for the learning model. Here, the learning model may be configured for performing a computing task based on machine learning. For example, the learning model may be used for image classification. For another example, the learning model may be used for performing other types of computing tasks related to various fields.

Figure 7:
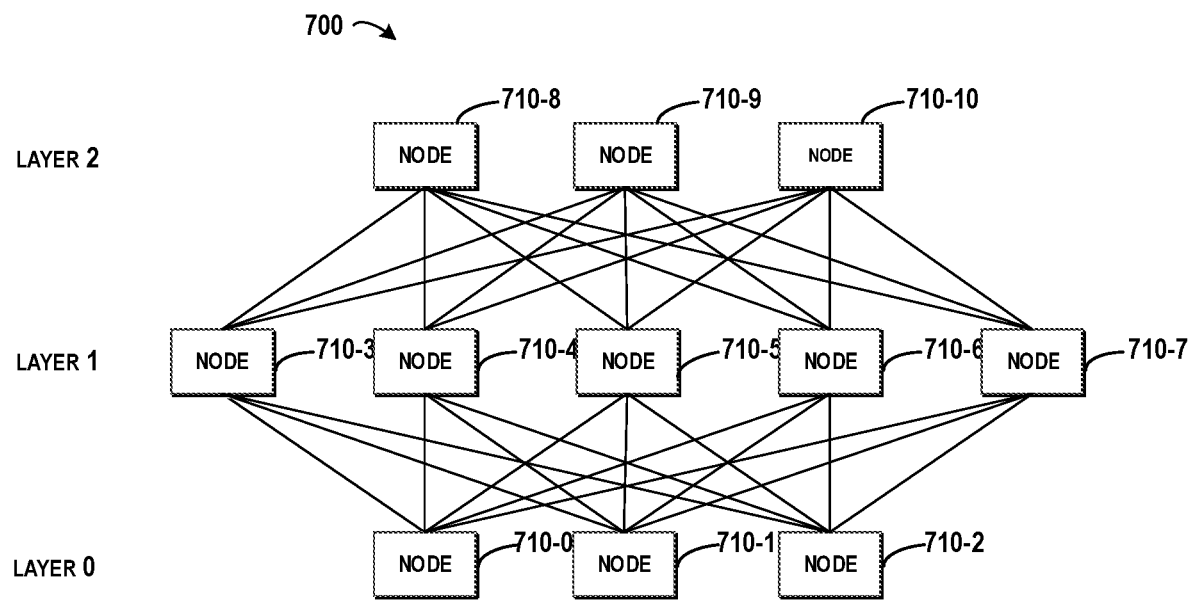
FIG. 7 depicts an example diagram of a learning model comprising a plurality of nodes according to an embodiment of the present invention.

Usually, the learning model may involve a plurality of nodes and connection relationship between these nodes. According to an embodiment of the present invention, in order to determine the network architecture 510 of the learning model, a connection relationship may be determined among a plurality of nodes comprised in the learning model, and reference will be made to FIG. 7 for description. FIG. 7 depicts an example diagram 700 of a learning model comprising a plurality of nodes according to an embodiment of the present invention. In FIG. 7, the learning model may comprise a plurality of nodes: Nodes 710-0, 710-1, 710-2, 710-3, 710-4, 710-5, 710-6, 710-7, 710-8, 710-9, 710-10. As depicted, an edge may exist between two nodes. For example, there is an edge between the node 710-3 and the node 710-0, and thus the two nodes are connected by the edge.

The network architecture may be determined based on the connection relationship and the plurality of nodes. According to an embodiment of the present invention, a directed acyclic graph (DAG) may be built for representing the network architecture 510. The DAG may be represented by a matrix and the value at location (i, j) in the matrix may represent whether Node i and Node j is connected. Taking the node 710-0 in FIG. 7 as an example, the node 710-0 is connected to the nodes 710-3, 710-4, 710-5, 710-6, and 710-7, while the node 710-0 is not connected to the node 710-1, 710-2, 710-8, 710-9 and 710-10. At this point, values at locations (0, 3), (0, 4), (0, 5), (0, 6) and (0, 7) may be set to 1, and values at locations (0, 1), (0, 2), (0, 8), (0, 9) and (0, 10) may be set to 0. Further, as the node 710-0 cannot be connected to itself, a value at location (0, 0) may be set to 0.

According to an embodiment of the present invention, the plurality of nodes may form a plurality of layers, and thus the plurality of layers formed by the plurality of nodes may be determined. Referring to FIG. 7, the learning model comprises three layers, where Layer 0 comprises the node 710-0, 710-1 and 710-2; Layer 1 comprises the node 710-3, 710-4, 710-5, 710-6 and 710-7, and Layer 2 comprises the node 710-8, 710-9 and 710-10. Therefore, the network architecture 510 may be determined based on the connection relationship and the plurality of layers.

According to an embodiment of the present invention, the network architecture 510 may be represented in form of a vector. For example, the vector may comprise data about each layer in the learning model and may be represented as: (Layer 0, Layer 1, . . . , Layer M), where M is an integer representing the number of the layers. The data structure of each layer may be defined according to various aspects of the layer. In an embodiment, the data structure may comprise the nodes that are included in the layer. Referring to FIG. 7 again, the data structure for Layer 0 may comprise nodes 710-0, 710-1 and 710-2.

According to an embodiment of the present invention, the data structure for each layer may further comprise the type of each node. For example, the node may be a neural network cell; alternatively, the node may be an activation function. If the type of the node is the neural network cell, the type may be sub-divided into kernel_x, kernel_y, stride_x, stride_y, and padding. If the type of the node is the activation function, then the type may be sub-divided into tan h, sigmoid, and ReLu. Definitions about the above terms are similar as general descriptions in the art and details are omitted hereinafter for the sake of simplicity. According to an embodiment of the present invention, the data structure for each layer may further comprise the connection relationship associated with each node. With respect to the node 710-0 in FIG. 7, the data structure may comprise a line in the DAG matrix which corresponds to the node 710-0: (0, 0, 0, 1, 1, 1, 1, 1, 0, 0, 0).

Figure 8:
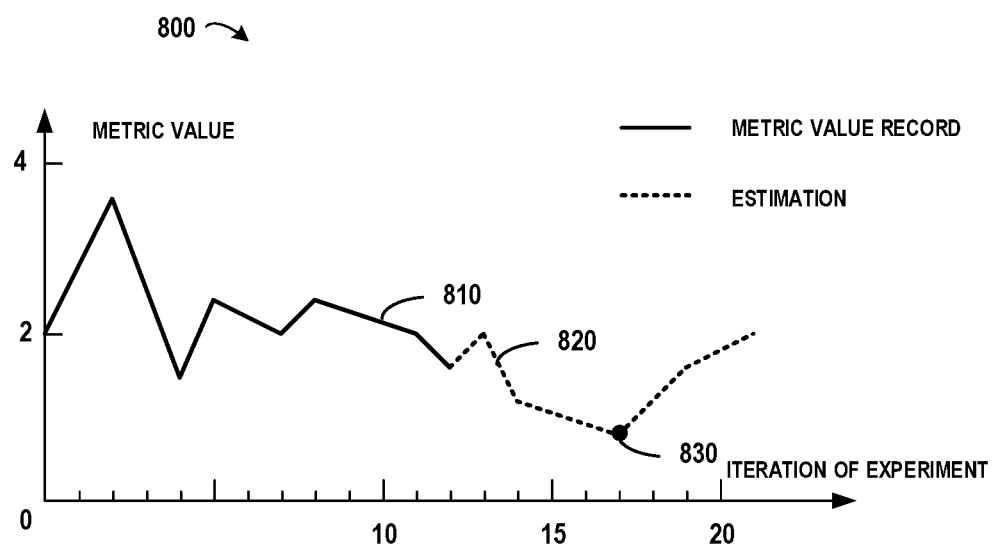
FIG. 8 depicts an example diagram for obtaining an estimation of a metric value according to an embodiment of the present invention.

At block 620, a metric value record associated with the group of hyper-parameters 420 may be obtained during the hyper-parameter determination 410 for the learning model. Here, the group of hyper-parameters 420 may include one or more hyper-parameters, and the metric value record may comprise only a portion of the iterations, and details will be provided with reference to FIG. 8. FIG. 8 depicts an example diagram 800 for obtaining the estimation 540 of a metric value according to an embodiment of the present invention.

In FIG. 8, a curve 810 (shown in a solid line) represents the metric value record which covers a range from the $0^{th}$ iteration to $12^{th}$ iteration of the experiments. With embodiments of the present invention, the metric value record may have less number of iterations, and then the estimation (as shown by a curve 820 in a dash line) may be determined based on the metric value record.

Referring back to FIG. 6, at block 630, the estimation 540 of a metric value may obtained based on the network architecture 510 and the metric value record 520. Referring to FIG. 8 again, the curve 820 may indicate the estimation which covers a range of the $13^{th}$ iteration to the $21^{st}$ iteration. In other words, based on the input of metric values between the $0^{th}$ iteration the $12^{th}$ iteration of the experiments, the association relationship 530 may output the estimated metric values for more iterations. A value 830 in the curve 820 may represent an extreme value during the hyper-parameter determination 410. At this point, the value 830 may be an indicator for indicating the appropriate level of the group of hyper-parameters.

In the above embodiment of the present invention, the association relationship 530 may represent an association between network architectures and metric values for the network architectures. Here, the association relationship 530 may be trained based on historical sample data.

At block 640, the group of hyper-parameters 420 may be selected if the estimation 540 of the metric value meeting a predefined criterion. As the estimation 540 may indicate an appropriate level of the group of hyper-parameters 420, if the estimation 540 is lower than the threshold, it indicates that the appropriateness of the group already meets the desired criterion. In an embodiment, the predefined criterion may be related to a predefined value. One criterion may define that if an extreme value in the estimation 540 being lower than a threshold, then the group of hyper-parameters may be selected; otherwise, the group of hyper-parameters may be discarded. With the above embodiment, the group of hyper-parameters 420 may be selected in an easy and convenient manner.

According to an embodiment of the present invention, the predefined criterion may be related to a comparison among multiple estimations associated to multiple groups of hyper-parameters. The extreme values in the multiple estimations may be compared to select a minimum one, and then the group of hyper-parameters associated with the minimum value may be selected.

Specifically, a further metric value record associated with a further group of hyper-parameters may be obtained during the hyper-parameter determination 410 for the learning model. Then, a further estimation of a metric value may be determined based on the network architecture, the further metric value record and the association relationship 530. A comparison may be implemented between the estimation 540 and the further estimation to see which one is closer to a convergence. If the estimation 540 of the metric value being closer to a convergence during the hyper-parameter determination 510 than the further estimation, the group of hyper-parameters 420 may be selected. With the above embodiment, performance of various groups of hyper-parameters may be compared so as to select a group of hyper-parameters with better performance.

According to an embodiment of the present invention, the estimation 540 of the metric value may comprise an extreme value among a plurality of metric values associated with a plurality of group of hyper-parameters during the hyper-parameter determination 510. Here, the estimation 540 shows a tendency of the metric values for various iterations.

With these embodiments, it is not required to implement a great number of iterations until the convergence. Instead, partial iterations may be implemented and then the estimation 540 may be obtained from the association relationship 530.

Figure 9:
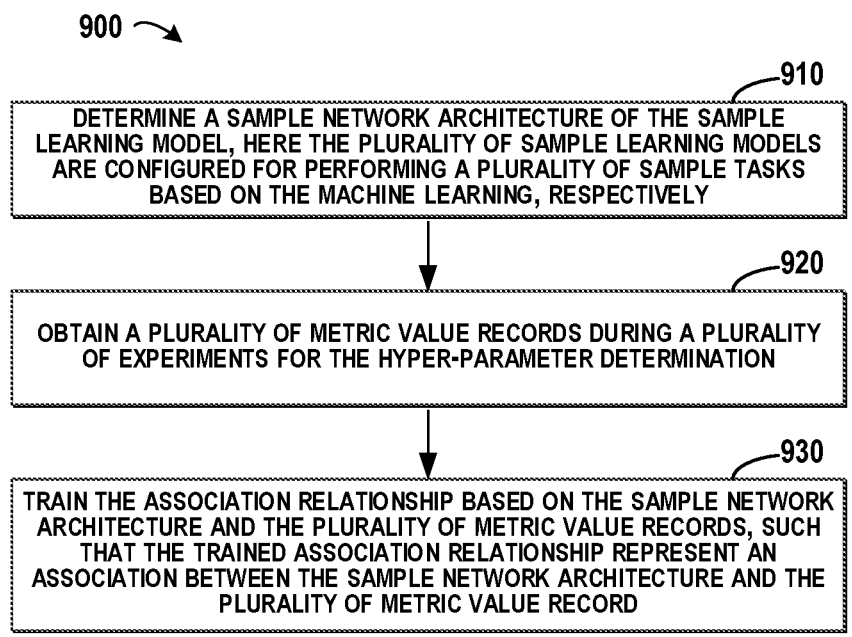
FIG. 9 depicts an example flowchart of a method for training an association relationship according to an embodiment of the present invention.

The preceding paragraphs have described how to select an appropriate group of hyper-parameters based on the association relationship 530. Hereinafter, reference will be made to FIG. 9 for details about how to obtain the association relationship 530. According to an embodiment of the present invention, the association relationship 530 may be obtained in advance based on sample data obtained from historical implementations. FIG. 9 depicts an example flowchart of a method 900 for training the association relationship 530 according to an embodiment of the present invention. The method 900 may be implemented to a sample learning model in a plurality of sample learning models. At block 910, a sample network architecture of the sample learning model may be determined. It is to be understood that the plurality of sample learning models may be configured for performing a plurality of sample tasks based on the machine learning, respectively. Here, the plurality of sample tasks may relate to the same field or involve different fields. In one example, one task may relate to image processing, and another task may relate to text processing or another field.

Further, the sample task and the computing task as described in FIG. 6 may relate to the same field or involve different fields. For the sake of description, the following paragraphs will take a learning model for image processing as an example of the sample teaming model. In another embodiment of the present invention, the sample learning model may be used for text processing. Here, the sample network architecture may be determined in a similar way as described at the block 610 in FIG. 6 and details will be omitted hereinafter.

At block 920, a plurality of metric value records may be obtained during a plurality of experiments for the hyper-parameter determination. Here, each of the plurality of metric value records may be determined in a similar way as described at the block 620 in FIG. 6 and details will be omitted hereinafter.

Figure 10A:
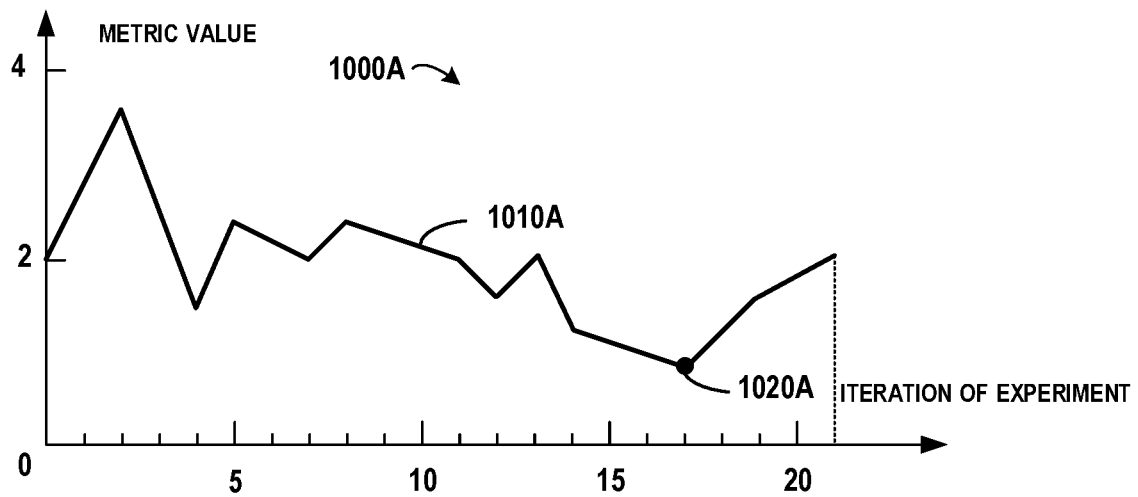
FIGS. 10A, 10B, and 10C depict example diagrams of a plurality of metric value records according to embodiments of the present invention.
Figure 10B:
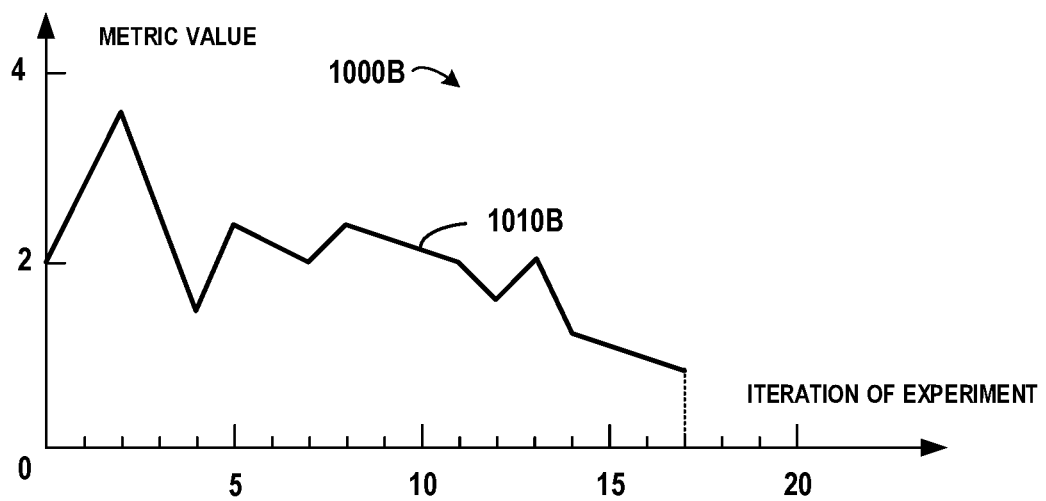
Figure 10C:
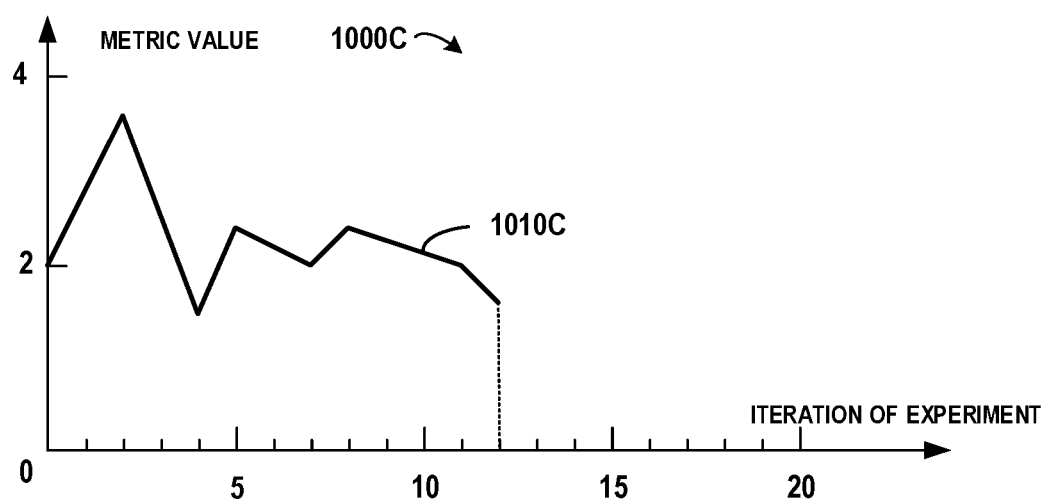

According to an embodiment of the present invention, the plurality of metric value records may be related to various progresses during the hyper-parameter determination 410. For example, in order to train the association relationship 530, the metric value records related to various percentages of the hyper-parameter determination may be obtained. Reference will be made to FIGS. 10A, 10B, and 10C for details about how to determine the plurality of metric value records.

FIG. 10A depicts an example diagram 1000A of a plurality of metric value records according to an embodiment of the present invention. As depicted in FIG. 10A, supposing 22 iterations (from the $0^{th}$ iteration to the $21^{st}$ iteration) are implemented during the hyper-parameter determination 410, the metric value records about the 22 iterations may be used as sample for training the association relationship 530.

According to an embodiment of the present invention, a convergence may be determined during the hyper-parameter determination 410. Referring to FIG. 10A, a curve 1010A represents a metric value record, where an extreme value 1020A is a metric value collected at the convergence. The whole metric value record may be selected for training the association relationship 530. As depicted in FIG. 10B, a curve 1010B may represent the metric value record corresponding to the convergence, which includes a portion of the iterations in FIG. 10A, and thus the metric value record by the curve 10109 may be used as sample data for the training.

According to an embodiment of the present invention, metric value records before or after the convergence may be used for the training. As depicted in FIG. 10C, a curve 1010C indicates the metric values collected between the $0^{th}$ iteration and the $12^{th}$ iteration. In this example, the metric value records before the convergence may be used for training. In another example, the metric value records after the convergence may be used for training. Although FIGS. 10A, 10B and 10C depict three metric value records for the training, more or less metric value records may be selected. For example, the association relationship 530 may be trained with 20%, 40%, 60%, 80%, 100%, 120%, 140% or another percentage of the iterations corresponding to the convergence.

Referring back to FIG. 9, at block 930, the association relationship 530 may be trained based on the sample network architecture and the plurality of metric value records, such that the trained association relationship may represent an association between the sample network architecture and the plurality of metric value record. In the training procedure, the sample network architecture and the plurality of metric value records may be used as the input of the association relationship 530, and the convergences in the corresponding records may be used as the output of the association relationship 530. After the training procedure, the association relationship 530 may generate an estimation indicating a convergence based on a portion of the iterations.

With these embodiments, the association relationship 530 may be trained with records of various percentages of the iterations, and thus the association relationship 530 may have the knowledge of various time points during the hyper-parameters determination. Therefore, the association relationship 530 may be well trained and reflect an accurate association between the network architectures and the metric value records. With the trained association relationship 530, the outputted estimation may accurately reflect the tendency of the change in the metric value.

Figure 11:
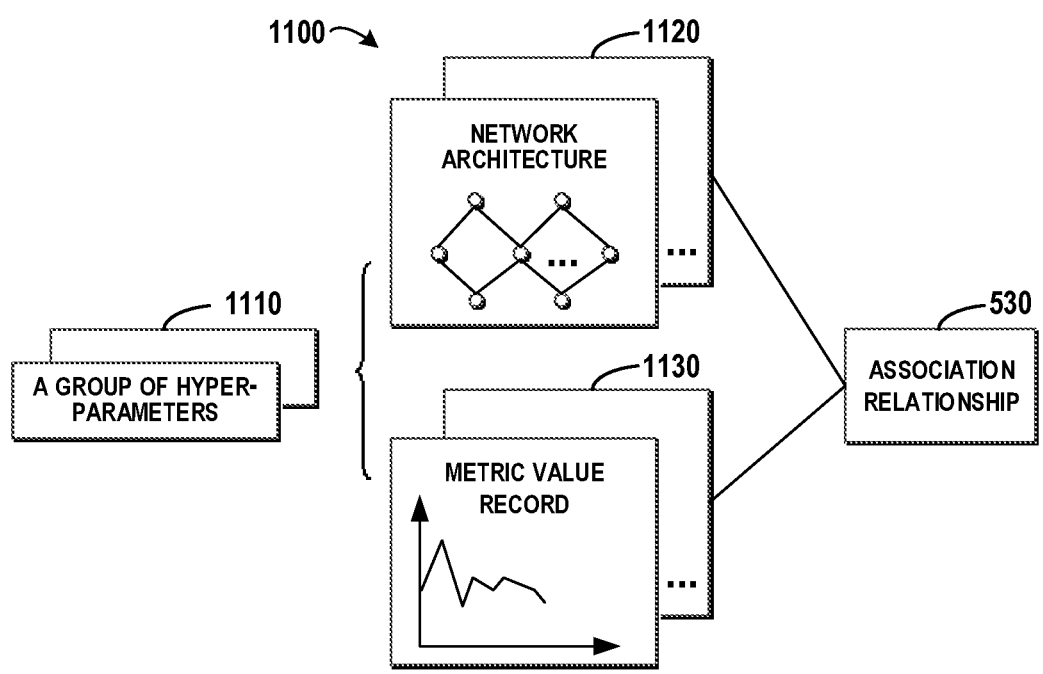
FIG. 11 depicts an example diagram for training an association relationship according to an embodiment of the present invention.

Although only one sample learning model is involved in describing the method 900 in the above paragraphs, more sample learning models may be used for the training procedure. FIG. 11 depicts an example diagram 1100 for training the association relationship 530 according to an embodiment of the present invention. As depicted in FIG. 11, a plurality of network architecture 1120 may be determining from a plurality of sample learning models. For each of the plurality of learning models, a plurality of groups of hyper parameters 1110 may be determined and a plurality of metric value records 1130 may be obtained according to procedures described in the proceeding paragraphs. Further, the plurality of network architecture 1120 and the plurality of groups of hyper parameters 1110 may be used for training the association relationship 530. With the above embodiment, the association relationship 530 may have rich knowledge about the network architectures and the metric value records, and provide a solid ground for the generating the estimation.

According to an embodiment of the present invention, once the group of hyper-parameters is selected, the learning model may be trained based on the selected of hyper-parameters. Specifically, a group of sample data may be obtained for training the learning model, and then the learning model may be trained based on the group of sample data and the selected group of hyper-parameters 420. Given that the learning model is for image classification, the sample data may comprise a plurality of images and items identified from images. Given that the learning model is for text processing such as extracting main ideas from articles, the sample data may comprise a plurality of articles and main ideas extracted from the plurality of articles. It is to be understood that the above only provide examples for sample data, the sample data may comprise other type of data in other embodiments.

With the above embodiment of the present invention, as the selected group of hyper-parameters are optimal ones which may yield an optimal learning model, the learning model trained based on the selected group of hyper-parameters may greatly increase the accuracy and performance for performing the computing task.

According to an embodiment of the present invention, an object that is to be processed by the computing task may be obtained, and then the object may be processed based on the trained learning model. Continuing the above example, if the learning model relates to image classification, the to-be-processed object may be an image. Once the image is inputted into the learning model, an item may be identified from the image and then the image may be classified into a type based on the identified item. For example, if an image including a cat is input, then the learning model may identify the item in the image as "a cat." With the above embodiment of the present invention, the objects may be processed based on an accurate learning model which is built from optimal group hyper-parameters.

The present invention may be a system, a method, and/or a computer program product at any possible technical detail level of integration. The computer program product may include a computer readable storage medium (or media) having computer readable program instructions thereon for causing a processor to carry out aspects of embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any appropriate combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any appropriate combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   determining, by one or more processors, a network architecture of a learning model, the learning model being configured for performing a computing task based on machine learning, wherein the network architecture is represented as a vector comprising data corresponding to each layer in the learning model, wherein a data structure associated with each layer in the machine learning model comprises a type of each node from among a plurality of nodes and a connection relationship associated with each node, wherein the type corresponds to a neural network cell or an activation function, and wherein the computing task includes at least one of image classification, face recognition, and text processing performed by the learning model, and wherein the network architecture is determined based on the connection relationship and the plurality of nodes by building a directed acyclic graph represented by a matrix and a value at a location in the matrix corresponding to whether two nodes from among the plurality of nodes are connected;
   obtaining, by the one or more processors, a metric value record associated with a group of hyper-parameters during hyper-parameter determination for the learning model;
   obtaining, by the one or more processors, an estimation of a metric value based on the network architecture, the metric value record and an association relationship representing an association between network architectures and metric values for the network architecture; and
   selecting, by the one or more processors, the group of hyper-parameters in response to the estimation of the metric value meeting a predefined criterion, wherein the predefined criterion corresponds to a comparison among multiple estimations associated with multiple groups of hyper-parameters; and
   training, by the one or more processors, the association relationship based on determining a number of iterations corresponding to a convergence associated with the selected group of hyper-parameters and obtaining metric value records for more iterations and less iterations than the number of iterations corresponding to the convergence,
   wherein the method further comprises: with respect to a sample learning model in a plurality of sample learning models,
      determining, by the one or more processors, a sample network architecture of the sample learning model, the plurality of sample learning models being configured for performing a plurality of sample tasks based on the machine learning, respectively;
      obtaining, by the one or more processors, a plurality of metric value records during a plurality of experiments for the hyper-parameter determination; and
      training, by the one or more processors, the association relationship based on the sample network architecture and the plurality of metric value records, such that the trained association relationship represents an association between the sample network architecture and the plurality of metric value records, wherein the plurality of metric value records corresponds to various percentages of the iterations relative to the convergence such that the association relationship has knowledge of various time points during hyper-parameters determination.

2. The method of claim 1, wherein the determining, by the one or more processors, the network architecture of the learning model comprises:
   extracting, by the one or more processors, the connection relationship among the plurality of nodes comprised in the learning model; and
   determining, by the one or more processors, the network architecture based on the connection relationship and the plurality of nodes.

3. The method of claim 2, wherein the determining, by the one or more processors, the network architecture based on the connection relationship and the plurality of nodes comprises:
   determining, by the one or more processors, a plurality of layers formed by the plurality of nodes; and
   determining, by the one or more processors, the network architecture based on the connection relationship and the plurality of layers.

4. The method of claim 1, further comprising:
   obtaining, by the one or more processors, a further metric value record associated with a further group of hyper-parameters during the hyper-parameter determination for the learning model;
   obtaining, by the one or more processors, a further estimation of a metric value based on the network architecture, the further metric value record and the association relationship; and wherein the selecting, by the one or more processors, the group of hyper-parameters in response to the estimation of the metric value meeting the predefined criterion comprises:
selecting, by the one or more processors, the group of hyper-parameters in response to the estimation of the metric value being closer to the convergence during the hyper-parameter determination than the further estimation.

5. The method of claim 4, wherein the estimation of the metric value comprises an extreme value among a plurality of metric values associated with a plurality of group of hyper-parameters during the hyper-parameter determination.

6. The method of claim 1, wherein the obtaining, by the one or more processors, the plurality of metric value records comprises:
obtaining, by the one or more processors, one of the plurality of the metric value records based on metric values associated with a progress of the hyper-parameter determination.

7. The method of claim 6, wherein the obtaining, by the one or more processors, one of the plurality of the metric value records comprises:
determining, by the one or more processors, the convergence during the hyper-parameter determination; and
obtaining, by the one or more processors, a metric value record based on the determined convergence.

8. The method of claim 1, further comprising:
obtaining, by the one or more processors, a group of sample data for training the learning model; and
training, by the one or more processors, the learning model based on the group of sample data and the selected group of hyper-parameters.

9. The method of claim 8, further comprising:
obtaining, by the one or more processors, an object that is to be processed by the computing task; and
processing, by the one or more processors, the object based on the trained learning model.

10. A computer-implemented system, comprising:
one or more processors, one or more computer-readable memories, one or more computer-readable tangible storage media, and program instructions stored on at least one of the
one or more computer-readable tangible storage media for execution by at least one of the one or more processors via at least one of the one or more computer-readable memories, wherein the computer system is capable of performing a method comprising:
determining a network architecture of a learning model, the learning model being configured for performing a computing task based on machine learning, wherein the network architecture is represented as a vector comprising data corresponding to each layer in the learning model, wherein a data structure associated with each layer in the machine learning model comprises a type of each node from among a plurality of nodes and a connection relationship associated with each node, wherein the type corresponds to a neural network cell or an activation function, wherein the computing task includes at least one of image classification, face recognition, and text processing performed by the learning model, and wherein the network architecture is determined based on the connection relationship and the plurality of nodes by building a directed acyclic graph represented by a matrix and a value at a location in the matrix corresponding to whether two nodes from among the plurality of nodes are connected;
obtaining a metric value record associated with a group of hyper-parameters during hyper-parameter determination for the learning model;
obtaining an estimation of a metric value based on the network architecture, the metric value record and an association relationship representing an association between network architectures and metric values for the network architecture;
selecting the group of hyper-parameters in response to the estimation of the metric value meeting a predefined criterion, wherein the predefined criterion corresponds to a comparison among multiple estimations associated with multiple groups of hyper-parameters; and
training the association relationship based on determining a number of iterations corresponding to a convergence associated with the selected group of hyper-parameters and obtaining metric values for more iterations and less iterations than the number of iterations corresponding to the convergence,
wherein the method further comprises: with respect to a sample learning model in a plurality of sample learning models,
determining, by the one or more processors, a sample network architecture of the sample learning model, the plurality of sample learning models being configured for performing a plurality of sample tasks based on the machine learning, respectively;
obtaining, by the one or more processors, a plurality of metric value records during a plurality of experiments for the hyper-parameter determination; and
training, by the one or more processors, the association relationship based on the sample network architecture and the plurality of metric value records, such that the trained association relationship represents an association between the sample network architecture and the plurality of metric value records, wherein the plurality of metric value records corresponds to various percentages of the iterations relative to the convergence such that the association relationship has knowledge of various time points during hyper-parameters determination.

11. The computer-implemented system of claim 10, wherein the determining the network architecture of the learning model comprises:
extracting the connection relationship among the plurality of nodes comprised in the learning model; and
determining the network architecture based on the connection relationship and the plurality of nodes.

12. The computer-implemented system of claim 11, wherein the determining the network architecture based on the connection relationship and the plurality of nodes comprises:
determining a plurality of layers formed by the plurality of nodes; and
determining the network architecture based on the connection relationship and the plurality of layers.

13. The computer-implemented system of claim 10, wherein the method further comprises:

obtaining a further metric value record associated with a further group of hyper-parameters during the hyper-parameter determination for the learning model;
obtaining a further estimation of a metric value based on the network architecture, the further metric value record and the association relationship; and
wherein the selecting the group of hyper-parameters in response to the estimation of the metric value meeting the predefined criterion comprises:
selecting the group of hyper-parameters in response to the estimation of the metric value being closer to the convergence during the hyper-parameter determination than the further estimation.

14. The computer-implemented system of claim 13, wherein the estimation of the metric value comprises an extreme value among a plurality of metric values associated with a plurality of group of hyper-parameters during the hyper-parameter determination.

15. The computer-implemented system of claim 10, wherein the obtaining the plurality of metric value records comprises:
obtaining one of the plurality of the metric value records based on metric values associated with a progress of the hyper-parameter determination.

16. The computer-implemented system of claim 15, wherein the obtaining one of the plurality of the metric value records comprises:
determining the convergence during the hyper-parameter determination; and
obtaining a metric value record based on the determined convergence.

17. The computer-implemented system of claim 10, wherein the method further comprises:
obtaining a group of sample data for training the learning model; and
training the learning model based on the group of sample data and the selected group of hyper-parameters.

18. A computer program product, the computer program product comprising a computer readable storage medium having program instructions embodied therewith, the program instructions executable by an electronic device to cause the electronic device to perform actions of:
determining a network architecture of a learning model, the learning model being configured for performing a computing task based on machine learning, wherein the network architecture is represented as a vector comprising data corresponding to each layer in the learning model, wherein a data structure associated with each layer in the machine learning model comprises a type of each node from among a plurality of nodes and a connection relationship associated with each node, wherein the type corresponds to a neural network cell or an activation function, and wherein the computing task includes at least one of image classification, face recognition, and text processing performed by the learning model, and wherein the network architecture is determined based on the connection relationship and the plurality of nodes by building a directed acyclic graph represented by a matrix and a value at a location in the matrix corresponding to whether two nodes from among the plurality of nodes are connected;
obtaining a metric value record associated with a group of hyper-parameters during hyper-parameter determination for the learning model;
obtaining an estimation of a metric value based on the network architecture, the metric value record and an association relationship representing an association between network architectures and metric values for the network architectures;
selecting the group of hyper-parameters in response to the estimation of the metric value meeting a predefined criterion, wherein the predefined criterion corresponds to a comparison among multiple estimations associated with multiple groups of hyper-parameters; and
training the association relationship based on determining a number of iterations corresponding to a convergence associated with the selected group of hyper-parameters and obtaining metric values for more iterations and less iterations than the number of iterations corresponding to the convergence,
wherein the actions further comprises: with respect to a sample learning model in a plurality of sample learning models,
determining, by the one or more processors, a sample network architecture of the sample learning model, the plurality of sample learning models being configured for performing a plurality of sample tasks based on the machine learning, respectively;
obtaining, by the one or more processors, a plurality of metric value records during a plurality of experiments for the hyper-parameter determination; and
training, by the one or more processors, the association relationship based on the sample network architecture and the plurality of metric value records, such that the trained association relationship represents an association between the sample network architecture and the plurality of metric value records, wherein the plurality of metric value records corresponds to various percentages of the iterations relative to the convergence such that the association relationship has knowledge of various time points during hyper-parameters determination.

* * * * *